(12) United States Patent
Bryant et al.

(10) Patent No.: US 10,168,156 B2
(45) Date of Patent: Jan. 1, 2019

(54) ORIENT A MOBILE DEVICE COORDINATE SYSTEM TO A VEHICULAR COORDINATE SYSTEM

(71) Applicant: International Business Machines Corporation, Armonk, NY (US)

(72) Inventors: Reginald E. Bryant, Nairobi (KE); Catherine H. Crawford, Carmel, NY (US); Inseok Hwang, Austin, TX (US); Aisha Walcott, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/467,428

(22) Filed: Mar. 23, 2017

(65) Prior Publication Data
US 2018/0274928 A1   Sep. 27, 2018

(51) Int. Cl.
*G07C 5/08*   (2006.01)
*G01C 21/16*   (2006.01)
*G01C 25/00*   (2006.01)

(52) U.S. Cl.
CPC .......... *G01C 21/16* (2013.01); *G01C 25/005* (2013.01); *G07C 5/085* (2013.01)

(58) Field of Classification Search
CPC ...... G01C 21/16; G01C 21/26; G01C 25/005; G07C 5/085; H04W 4/046
See application file for complete search history.

(56) References Cited

U.S. PATENT DOCUMENTS

| | | | |
|---|---|---|---|
| 8,180,379 B2 | 5/2012 | Forstall et al. | |
| 8,204,684 B2 | 6/2012 | Forstall et al. | |
| 8,423,255 B2 | 4/2013 | Padmanabhan et al. | |
| 8,930,229 B2 | 1/2015 | Brown et al. | |
| 9,253,603 B1 | 2/2016 | Dong et al. | |
| 9,363,734 B2 * | 6/2016 | Rajeevalochana | .... H04W 4/027 |
| 9,448,250 B2 * | 9/2016 | Pham | ..... G01C 17/38 |
| 2009/0259424 A1 | 10/2009 | Dutta et al. | |
| 2012/0053805 A1 * | 3/2012 | Dantu | ........ B60W 40/09 |
| | | | 701/70 |
| 2014/0149145 A1 | 5/2014 | Peng et al. | |

(Continued)

OTHER PUBLICATIONS

Mohan et al., "Nericell: Rich Monitoring of Road and Traffic Conditions using Mobile Smartphones," SenSys'08—Proceedings of the 6th ACM Conference on Embedded Networked Sensor Systems, Nov. 2008, Raleigh, NC, 14 pages.

*Primary Examiner* — Michael J Zanelli
(74) *Attorney, Agent, or Firm* — VanLeeuwen & VanLeeuwen; Mercedes L. Hobson

(57) ABSTRACT

An approach is provided by a mobile information handling system that includes a processor, and a gyroscope, a gravity sensor, and a memory each accessible by the processor. The approach identifies, at the mobile device that is moving with a vehicle, when a rotation of the gyroscope is at a near-zero moment, and an acceleration, wherein the acceleration is detected as being on a plane that is near-perpendicular with a gravity sensed by the gravity sensor. Then the detection is made, the approach determines a direction of the vehicle as being parallel to a direction of the detected acceleration. The approach then aligns a coordinate system used in the mobile device based on the determined direction of the vehicle.

17 Claims, 8 Drawing Sheets

(56) References Cited

U.S. PATENT DOCUMENTS

2014/0379207 A1* 12/2014 Katsman .............. G01C 21/165
                                                    701/33.2
2015/0355224 A1* 12/2015 Greer ...................... G01P 15/18
                                                    702/141
2015/0382156 A1    12/2015 Gruteser et al.

* cited by examiner

ORIENT A MOBILE DEVICE COORDINATE SYSTEM TO A VEHICULAR COORDINATE SYSTEM

BACKGROUND OF THE INVENTION

Description of Related Art

Traditionally, the vast majority of mobile devices contain sensors that allow for the measurement of acceleration forces and rotational forces including accelerometers, gravity sensors, gyroscopes and rotational sensors. Because mobile device ownership is extremely high, even in the developing areas of the world, the data from mobile devices can be very helpful in gathering information on a large scale. One idea is to use the data from sensors in mobile devices to detect pot holes and other dangerous road conditions. More specifically, drivers would run an application on their mobile devices while driving and the application would cause an alert to be sent to a centralized server with a location coordinate when a pot hole was sensed by the mobile device. However, a major problem with such an idea is that the devices sensors are oriented under the device's local coordinate system which may not match the coordinate system of the vehicle depending on how the device is oriented relative to the vehicle. If the device is oriented such that it does not align with the coordinates of the vehicle, then the application will not be able to sense pot holes with sufficient accuracy.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
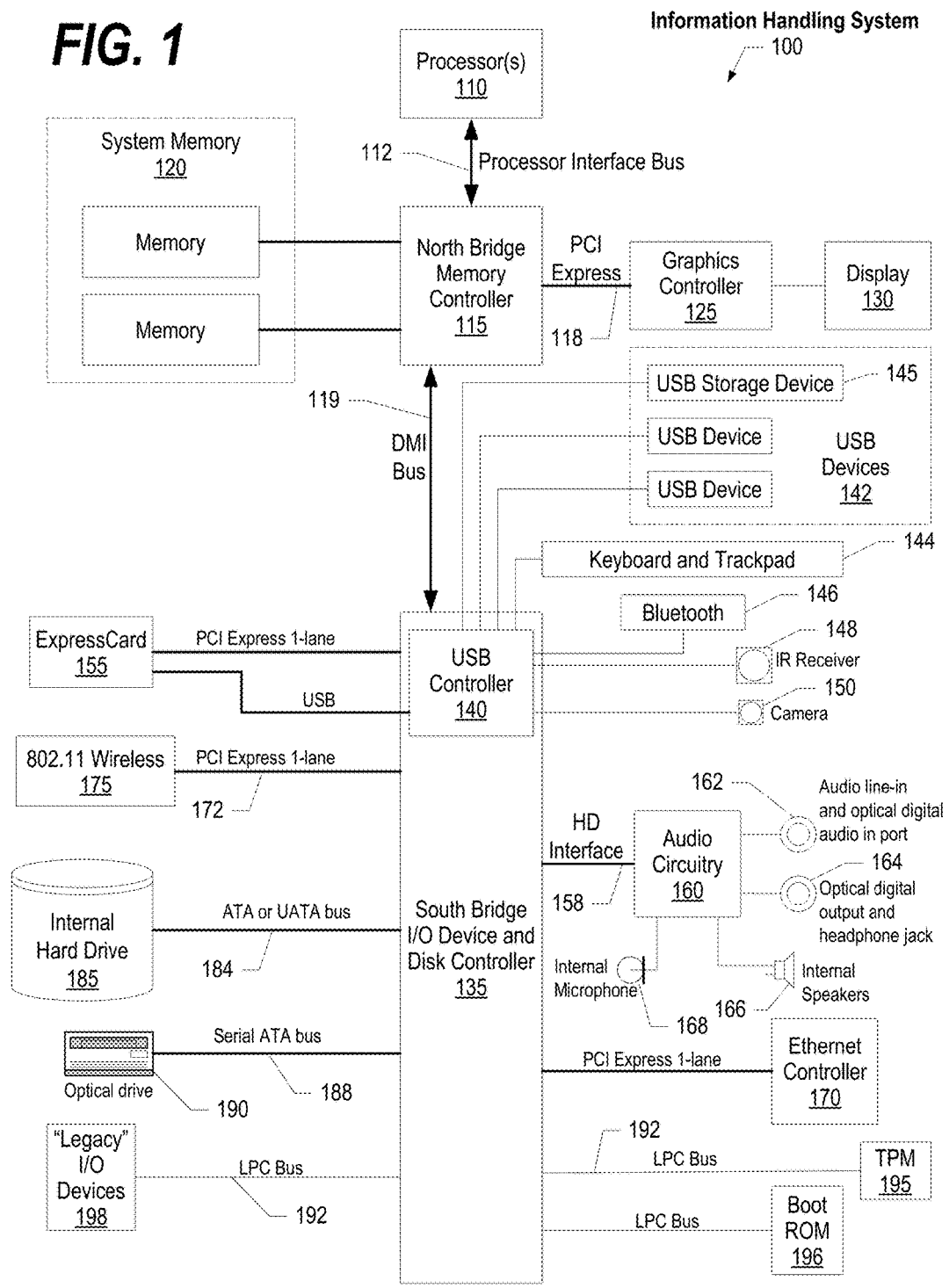
FIG. 1 depicts a block diagram of a network of data processing systems in which illustrative embodiments may be implemented.

FIGS. 1-8 show an approach that relates to mobile devices. This approach uses a methodology that can be implemented in software by the application to re-orient the coordinate system of the mobile device to align with the coordinate system of the vehicle thereby allowing the application running on the device to accurately detect and alert the sensing of a pot hole. The approach determines the coordinate system of the vehicles relative to the device to generate a transformation/rotation matrix for the sensor readings. Traditional methods to reorient the coordinate system of a device relative to a vehicle using the GPS in a device to detect the movement but suffer from low accuracy due to the low resolution of GPS-driven headings. In contrast, the approach provided herein uses a gyroscope and accelerometers to determine the heading of the vehicle, namely taking many acceleration measurements when the gyroscope readings are below a threshold indicating the vehicle is moving straight. Once the heading of the vehicle is determined, the coordinate system pertaining to the vehicle becomes known and the current orientation of the mobile device is then re-oriented to align with the determined coordinate system of the vehicle.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium does not include a computer readable signal medium.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 2:
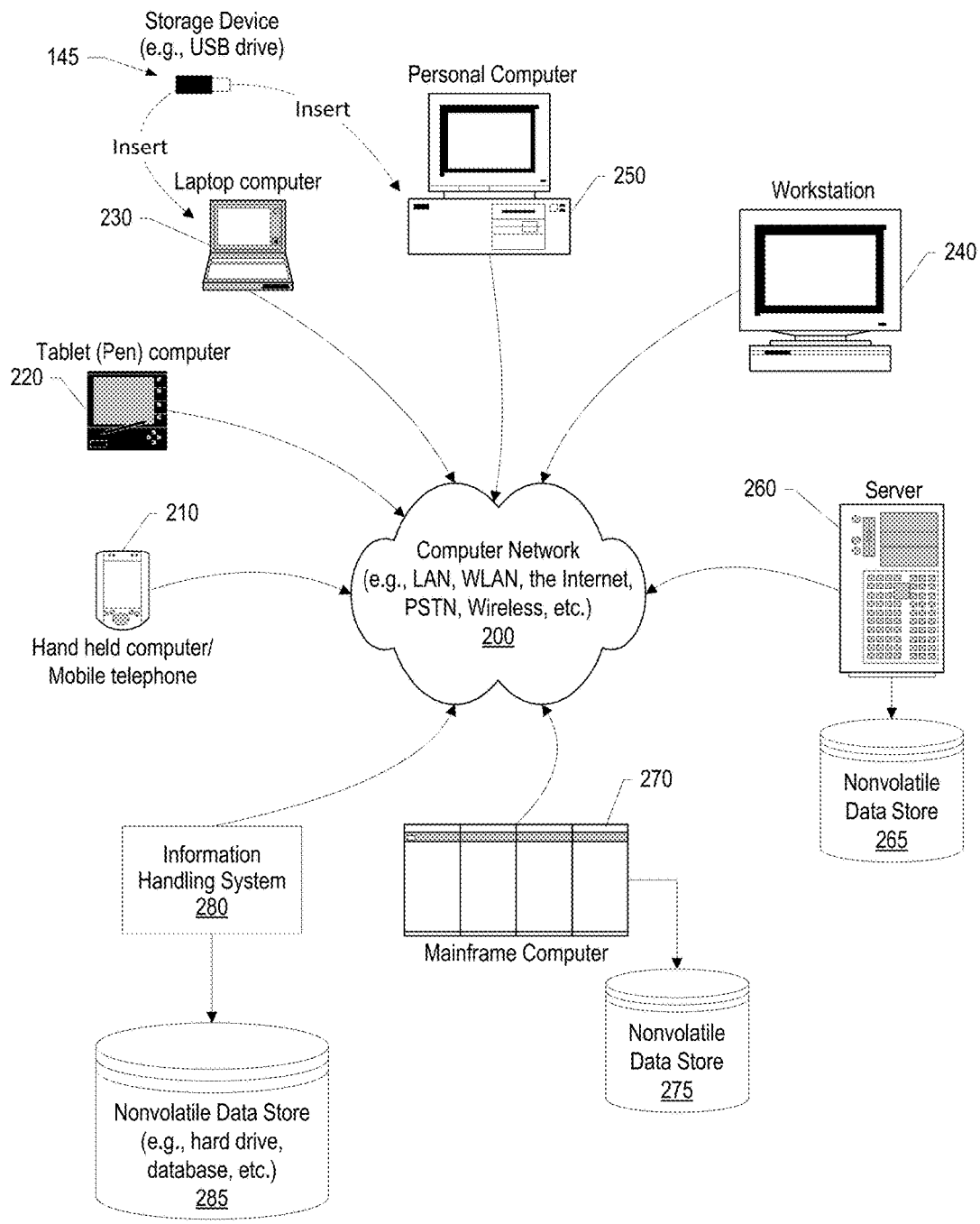
FIG. 2 depicts a block diagram of a data processing system in which illustrative embodiments may be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3A:
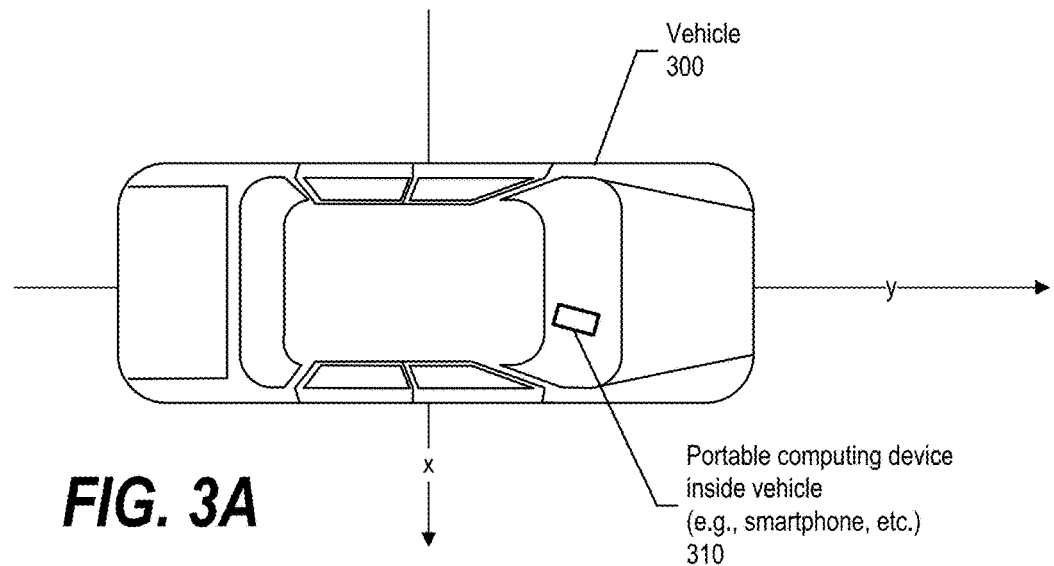
FIG. 3A depicts a top view of an automobile with one orientation and a mobile device with a somewhat different orientation.

FIG. 3A depicts a top view of an automobile with one orientation and a mobile device with a somewhat different orientation. Showing a top view perspective, vehicle 300 has an x and y position with the x direction, as shown, being perpendicular to the direction of the vehicle. Accordingly, the y direction is shown parallel with the vehicle's direction. Mobile information handling system 310, such as a smart phone, etc., is shown inside the vehicle with a direction that is not aligned with the direction of the vehicle. Processes described herein will determine the direction of the vehicle from the perspective of the mobile information handling system and then align the coordinate system used by the mobile information handling system to be the same as the current coordinate system used by the vehicle.

Figure 3B:
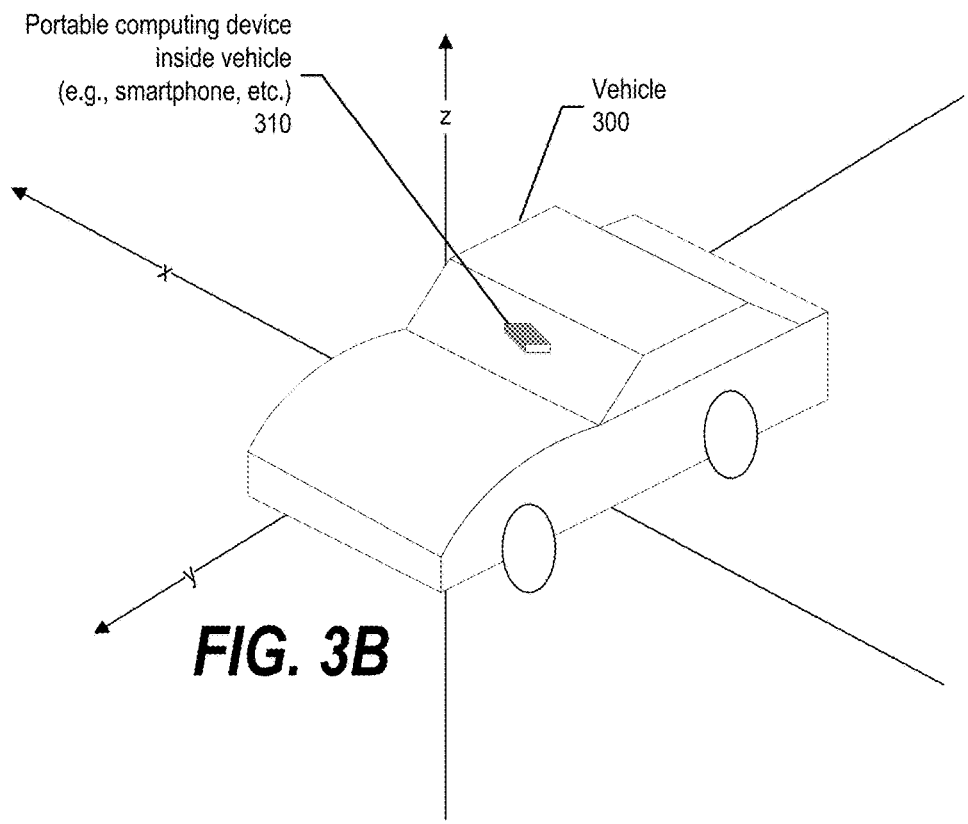
FIG. 3B depicts a perspective view of the automobile with one orientation and the mobile device with a somewhat different orientation.

FIG. 3B depicts a perspective view of the automobile with one orientation and the mobile device with a somewhat different orientation. This is a similar setting as shown in FIG. 3A with the orientation (x, y, and z coordinates) of vehicle 300 being different from the coordinates of mobile information handling system as placed in the vehicle. In FIG. 3B, vehicle 300 is shown with x, y, and z coordinate directions. As in FIG. 3A, the x direction is shown perpendicular to the direction of the vehicle and the y direction is shown parallel to the direction of the vehicle. In addition, a z vector is shown in FIG. 3B with the z vector being parallel with the force of gravity on the vehicle.

Figure 4:
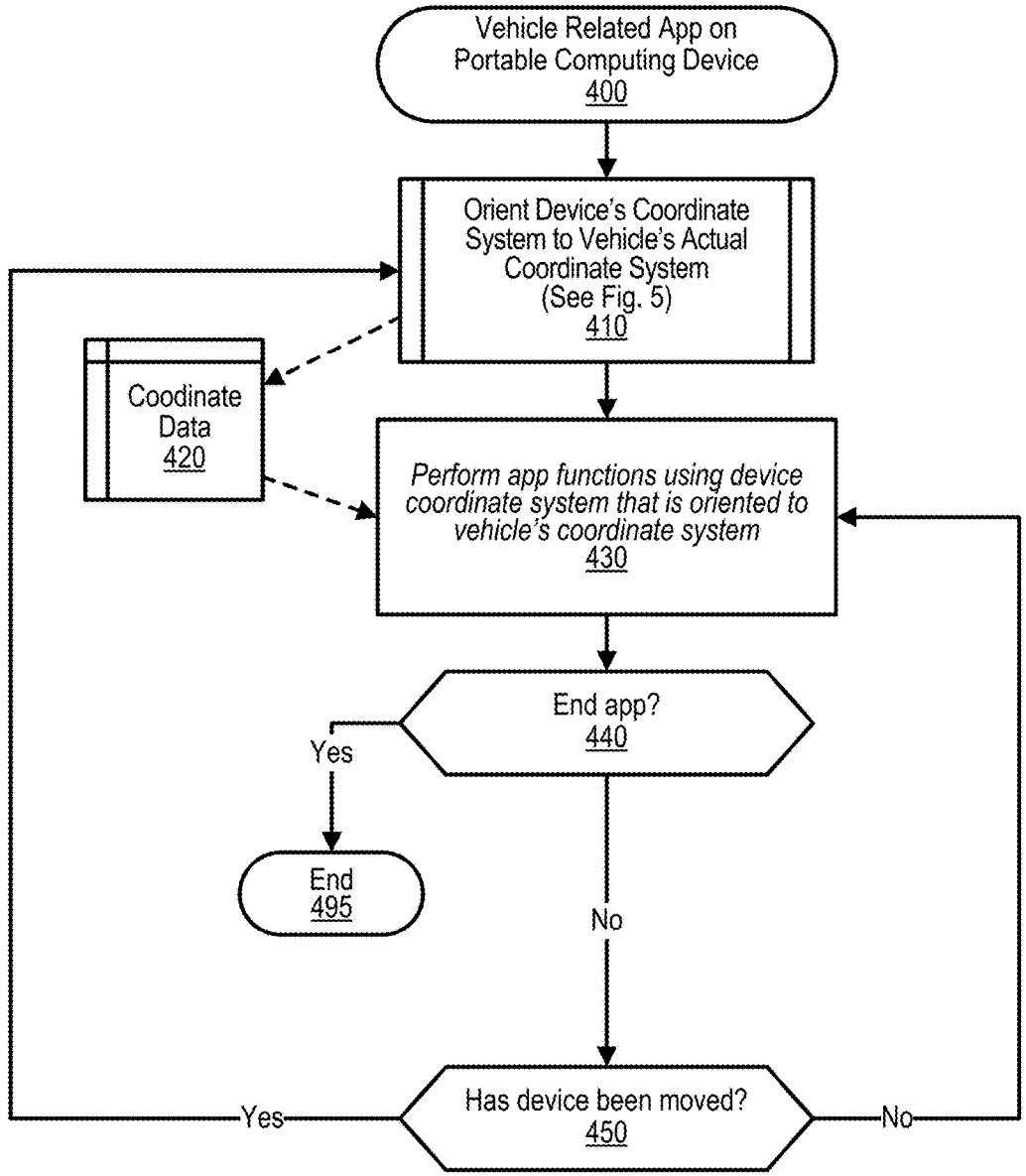
FIG. 4 depicts a flowchart showing a vehicle related application running on a mobile device to re-orient the mobile device with respect to the vehicle's current orientation.

FIG. 4 depicts a flowchart showing a vehicle related application running on a mobile device to re-orient the mobile device with respect to the vehicle's current orientation. FIG. 4 processing commences at 400 and shows the steps taken by a process that vehicle Related App on Portable Computing Device. At predefined process 410, the process performs the Orient Device's Coordinate System to Vehicle's Actual Coordinate System routine (see FIG. 5 and corresponding text for processing details). The coordinate data determined by predefined process 410 is stored in memory area 420.

At step 430, the process performs application functions using the device's coordinate system that is now oriented to vehicle's coordinate system by utilizing the coordinate data that was stored in memory area 420. The process determines as to whether the application has been ended, such as by being turned off by a user of the application (decision 440). If the application has ended, then decision 440 branches to the 'yes' branch whereupon the process is ended at 495. On the other hand, if the application continues to operate, then decision 440 branches to the 'no' branch to continue processing. When operation of the application continues, the process determines whether the mobile device been moved, causing the previously found orientation alignment between the mobile device and the vehicle to have been changed (decision 450). If the mobile device been moved, then decision 450 branches to the 'yes' branch which loops back to predefined process 410 to re-orient the device's coordinate system to the vehicle's actual coordinate system. On the other hand, if the device has not been moved, then decision 450 branches to the 'no' branch which loops back to step 430 to continue performing application functions.

Figure 5:
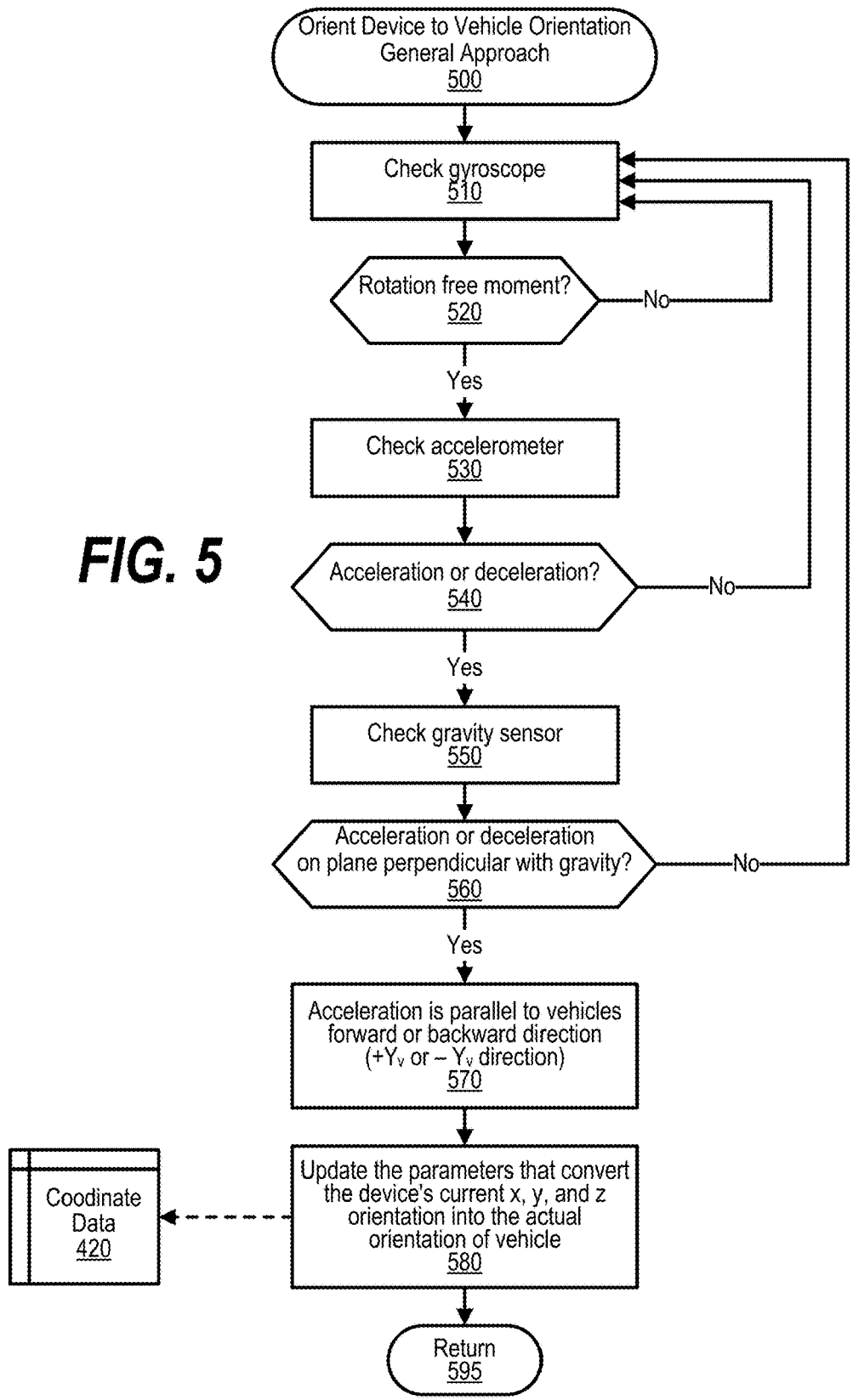
FIG. 5 depicts a flowchart showing a general approach of the steps used to orient the mobile device to the vehicle's current orientation.
Figure 6:
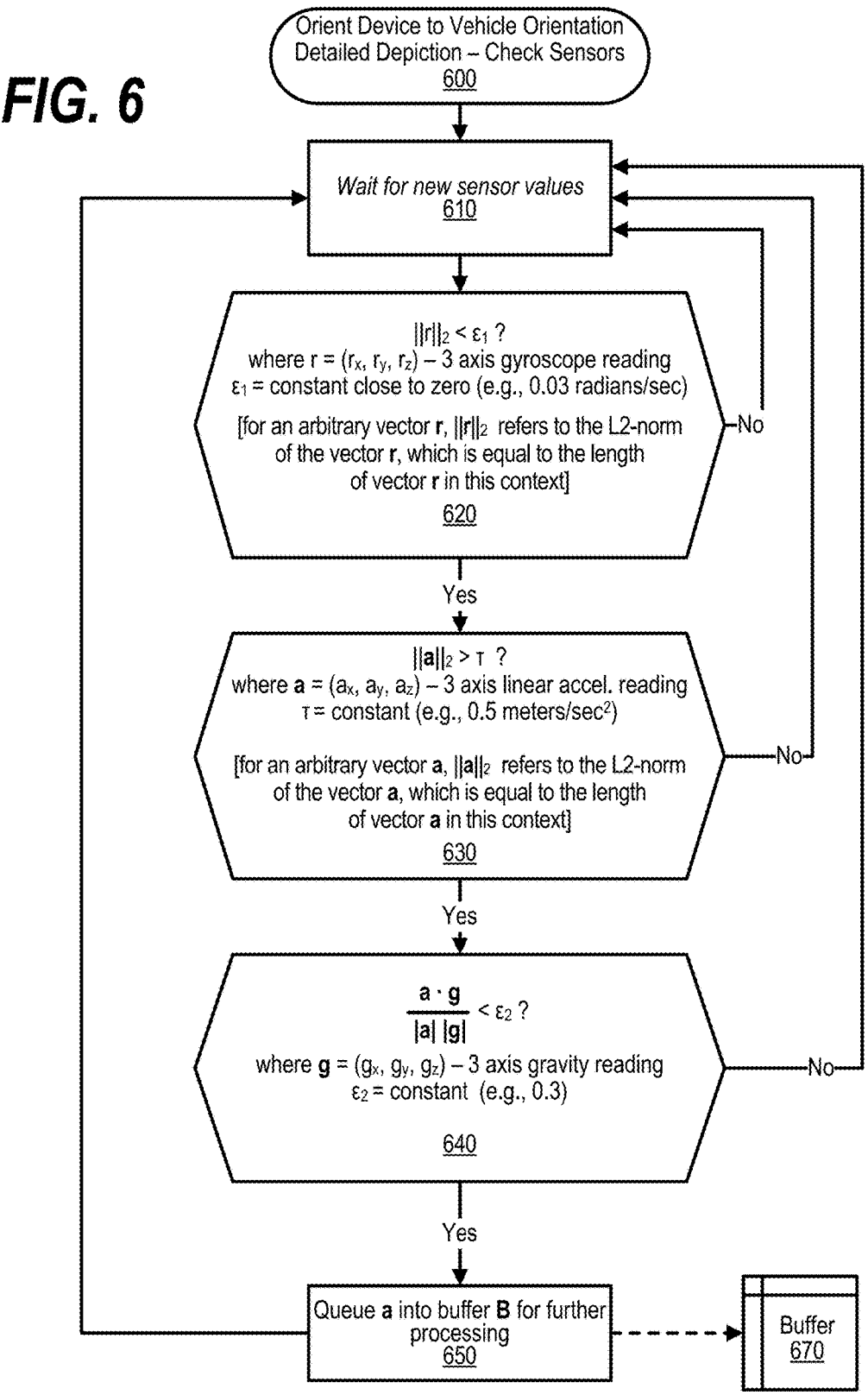
FIG. 6 depicts a flowchart showing a more detailed depiction of the steps used to orient the mobile device to the vehicle's current orientation.
Figure 7:
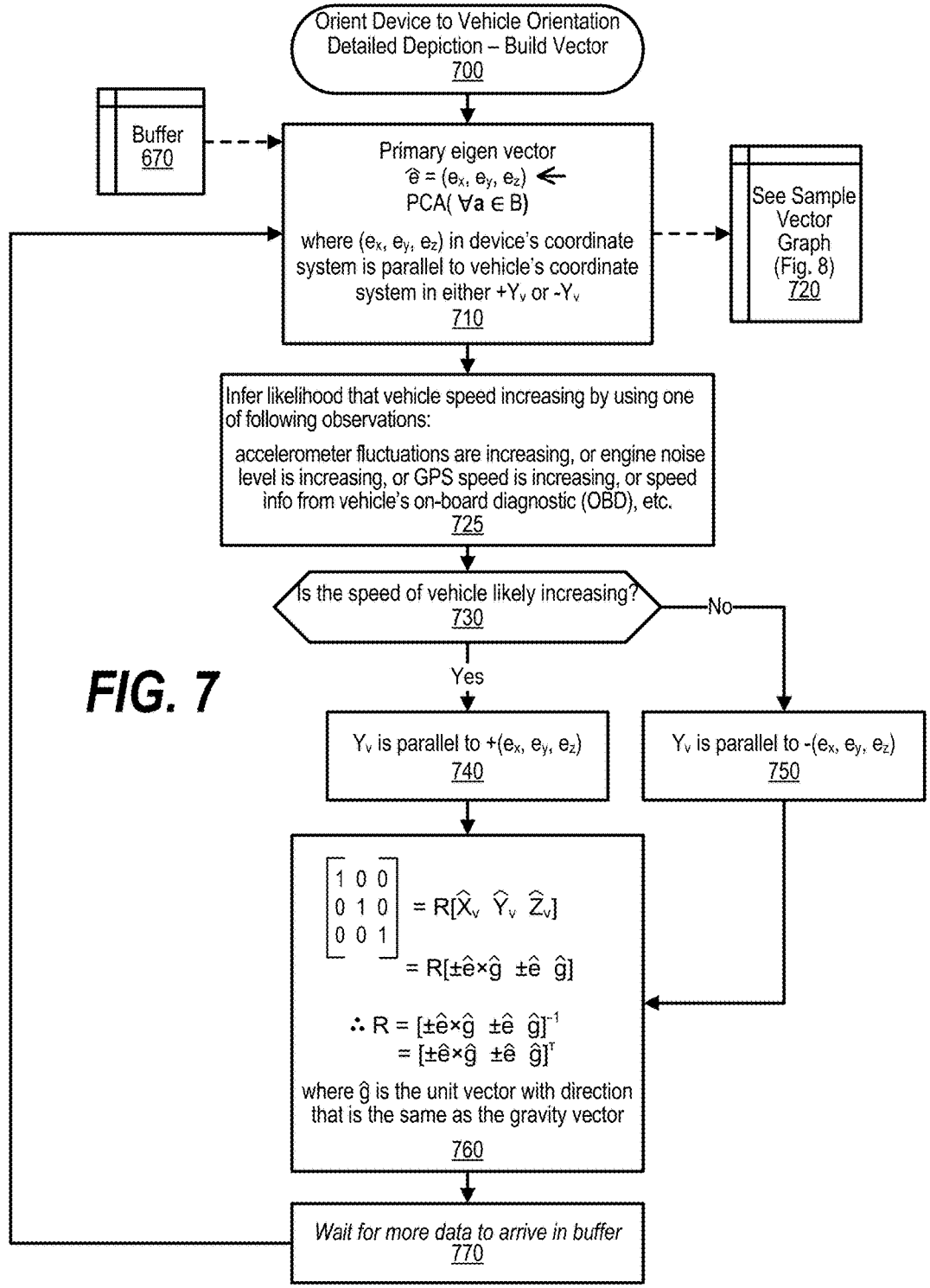
FIG. 7 depicts a flowchart showing the steps taken during the detailed depiction of building a vector that is used to orient the mobile device with the vehicle.
Figure 8:
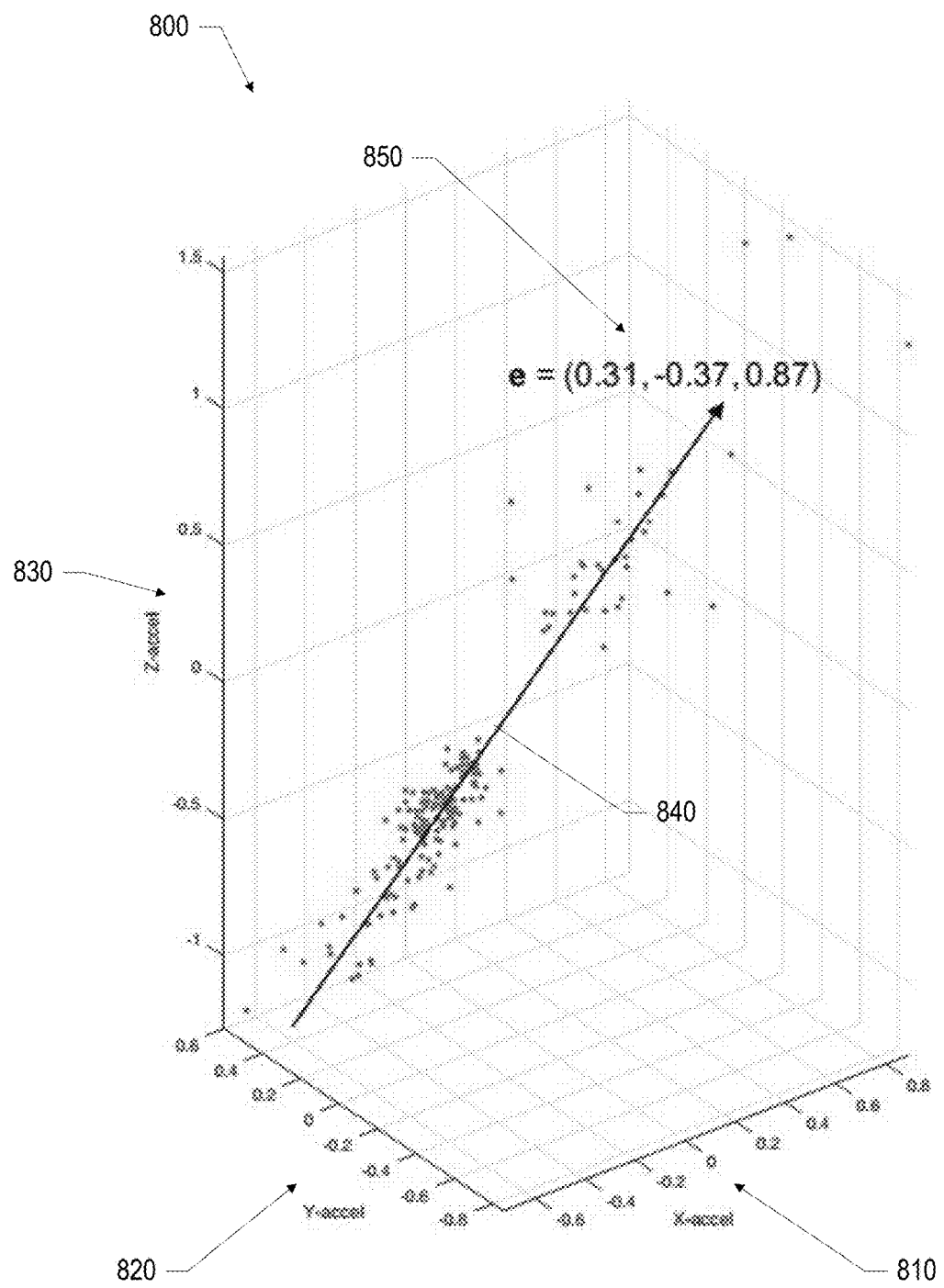
FIG. 8 depicts a sample primary eigenvector graph from which the orientation of the vehicle can be determined.

FIG. 5 depicts a flowchart showing a general approach of the steps used to orient the mobile device to the vehicle's current orientation. FIG. 5 processing commences at 500 and shows the steps taken by a process that orients the coordinate system used by the mobile device to align with the vehicle's actual orientation. FIG. 5 presents a general approach to perform the orientation, while FIGS. 6-8 show a more detailed embodiment that can be used to align the mobile device with the vehicle's actual orientation.

At step 510, the process checks the gyroscope for current rotation readings pertaining to the vehicle. The process determines as to whether the gyroscope detected a near-rotation free moment (decision 520). If the gyroscope detected a near-rotation free moment, then decision 520 branches to the 'yes' branch for further processing. On the other hand, if the gyroscope did not detect a rotation free moment, then decision 520 branches to the 'no' branch which inhibits further analysis of orientating the mobile device with the vehicle until a near-rotation free moment is detected and processing loops back to step 510 and will continue looping until a near-rotation free moment is detected.

When a near-rotation free moment is detected at the gyroscope then, at step 530, the process checks the accelerometer or other instrumentation for readings pertaining to the vehicle's acceleration. As described herein, acceleration can be positive acceleration or negative acceleration, otherwise known as deceleration. The process determines as to whether the instrumentation, such as an accelerometer, detected acceleration (positive or negative, at decision 540). If the instrumentation detected acceleration, then decision 540 branches to the 'yes' branch for further processing. On the other hand, if the instrumentation did not detect acceleration, then decision 540 branches to the 'no' branch which inhibits further analysis of orientating the mobile device with the vehicle until a both a near-rotation free moment is detected and the vehicle is detected as accelerating. Processing loops back to step 510 and will continue looping until both a near-rotation free moment and vehicle acceleration is detected.

At step 550, the process checks a gravity sensor, such as an accelerometer. The process determines as to whether the instrumentation, such as an accelerometer, detected acceleration that is on a geometric plane that is perpendicular or nearly perpendicular (collectively, "near-perpendicular") with the detected force of gravity (decision 560). If the instrumentation detected acceleration that is on a geometric plane that is near-perpendicular with the detected force of gravity, then decision 560 branches to the 'yes' branch for further processing. On the other hand, if the instrumentation did not detect acceleration being on a geometric plane that is near-perpendicular with the detected force of gravity, then decision 560 branches to the 'no' branch which inhibits further analysis of orientating the mobile device with the vehicle until all three conditions of a near-rotation free moment, the vehicle is accelerating, and the acceleration is on a plane that is near-perpendicular to the force of gravity are detected. Until all three conditions are detected, processing loops back to step 510 and will continue looping until all three conditions are detected. When all three conditions are satisfied then, at step 570, the process notes that the acceleration of the vehicle is parallel to the vehicle's forward or backward direction (+Yv or −Yv direction).

At step 580, the process updates the parameters that convert the device's current x, y, and z orientation into the actual orientation of vehicle. This coordinate data is stored in memory area 420. FIG. 5 processing thereafter returns to the calling routine (see FIG. 4) at 595.

FIG. 6 depicts a flowchart showing a more detailed depiction of the steps used to orient the mobile device to the vehicle's current orientation. FIG. 6 processing commences at 600 and shows the steps taken by a process that orient a mobile device to a moving vehicle's orientation. FIG. 6 provides a more detailed embodiment than the depiction shown in FIGS. 4 and 5. FIG. 6 shows detailed steps taken that check sensors and queue acceleration data when sensor conditions are satisfied. At step 610, the process waits for new sensor values from sensors included in the mobile device and perhaps from sensors included in the vehicle, depending upon the implementation.

The process determines as to whether the gyroscope reading is showing that the gyroscope has little to no rotation (decision 620). In particular, the decision checks as to whether $\|r\|2 < \varepsilon 1$. If $\|r\|2 < \varepsilon 1$, where $r=(r_x, r_y, r_z)$–3 axis gyroscope reading $\varepsilon_1$=constant close to zero (e.g., 0.03 radians/sec). When this condition is satisfied, decision 620 branches to the 'yes' branch to continue processing sensor data. On the other hand, if $\|r\|2 >= \varepsilon 1$, then the gyroscope sensor is showing a non-rotation free moment and data is not gathered and decision 620 branches to the 'no' branch, bypassing the remaining steps and looping back to step 610 to continue retrieving sensor data until the gyroscope reading shows a near-zero rotation.

When the gyroscope reading shows a near-zero rotation, then the process next determines whether $\|a\|2 > T$ where $a=(a_x, a_y, a_z)$, which is a three axis linear acceleration reading, and where T=a constant (e.g., 0.5 meters/sec$^2$). For an arbitrary vector a, $\|a\|_2$ refers to the L2-norm of the vector a, which is equal to the length of vector a in this context] (decision 630). If $\|a\|2 > T$, then decision 630 branches to the 'yes' branch for further processing of sensor data. On the other hand, if $\|a\|2 <= T$, then decision 630 branches to the 'no' branch, bypassing the remaining steps and looping back to step 610 to continue retrieving sensor data until the gyroscope reading shows a near-zero rotation and the acceleration of the vehicle is found to be accelerating or decelerating.

When the gyroscope reading shows a near-zero rotation and the acceleration of the vehicle is found to be accelerating or decelerating, then decision 630 branches to the 'yes' branch and the process next determines whether the acceleration is on a plane that is perpendicular, or nearly perpendicular (collectively, "near-perpendicular") to the force of gravity (decision 640). For this determination, the process checks if $(a*g)/(|a|*|g|) < c2$ where $g=(gx, gy, gz)$ (a three-axis gravity reading), and where c2 is a constant value (e.g., 0.3) (decision 640). If the acceleration is on a plane near-perpendicular to the force of gravity, then decision 640 branches to the 'yes' branch. On the other hand, if the acceleration is not on a plane near-perpendicular to the force of gravity then decision 640 branches to the 'no' branch bypassing step 650 and looping back to continue checking sensor readings until the conditions of decisions 620, 630, and 640 are all satisfied.

When the conditions of decisions 620, 630, and 640 are all satisfied, then, at step 650, the process queues vector "a" into buffer 670 for further processing that is shown in FIG. 7 and the processing shown in FIG. 6 loops back to step 610 to continue processing sensor data.

FIG. 7 depicts a flowchart showing the steps taken during the detailed depiction of building a vector that is used to orient the mobile device with the vehicle. FIG. 7 processing commences at 700 and shows the steps taken by a process that orients a mobile device to the vehicle orientation. FIG. 7 shows a detailed depiction that builds a vector (shown in FIG. 8) that is the vector used to align the mobile device's coordinate system to the vehicle's actual heading and coordinate system.

At step 710, the process retrieves acceleration data from buffer 670 with such data being stored in the buffer in FIG. 6 when certain conditions were satisfied. Primaries eigenvector is computed using the algorithm shown in box 710. Namely, $e=(e_x, e_y, e_z) \leftarrow PCA(\forall\ a \in B)$ where $(e_x, e_y, e_z)$ in device's coordinate system is parallel to vehicle's coordinate system in either $+Y_v$ or $-Y_v$. The resulting eigenvector (e) is graphed in vector graph 720 (see FIG. 8 for a sample vector graph).

At step 725, the process infers the likelihood that the vehicle speed is increasing by using one many possible observations such as the accelerometer fluctuations are increasing, engine noise level is increasing, GPS speed values are increasing, or speed information from the vehicle's on-board diagnostic (OBD) indicate that the vehicle's speed is increasing, etc.

Based on the observations of step 725, the process determines whether is the speed of vehicle likely increasing (accelerating) or decreasing (decelerating) in decision 730. If the speed of the vehicle likely increasing (accelerating), then decision 730 branches to the 'yes' branch whereupon, at step 740 the forward direction $(Y_v)$ of the vehicle is determined as the positive vector from vector graph 720 ($Y_v$ is determined to be parallel to $+(e_x, e_y, e_r)$). On the other hand, if the speed of the vehicle likely decreasing (decelerating), then decision 730 branches to the 'no' branch whereupon, at step 750 the forward direction $(Y_v)$ of the vehicle is determined as the negative vector from vector graph 720 ($Y_v$ is determined to be parallel to $+(e_x, e_y, e_r)$).

At step 760, the rotation matrix R is being computed. Step 760 begins with the equality condition that, applying the rotation matrix R to the unit vectors representing the vehicle's X-, Y-, and Z-directions measured in the mobile device's coordinate system must result in an identity matrix measured in the vehicle's coordinate system. The right-hand side matrix represents the X-, Y-, and Z-directions measured in the mobile device's coordinate system as follows: the Z-direction vector in the mobile device's coordinate system is equal to the gravity vector $\hat{g}$; the Y-direction vector in the mobile device's coordinate system is equal to either the positive eigen vector $+\hat{e}$ or the negative eigen vector $-\hat{e}$ depending on the result from the box 730; the X-direction vector in the mobile device's coordinate system should be perpendicular to both the Y- and Z-directions, thereby is equal to the cross-product of those two vectors. Finally, the rotation matrix R is obtained by taking the inverse of the right-hand side matrix. In this case, the inverse matrix is equal to the transpose of the right-hand side matrix because an inverse rotation matrix is equal to the transposed matrix. At step 770, the process waits for more data to arrive in buffer. When more data arrives in buffer 670, the process loops back to step 710 to process the data as described above.

FIG. 8 depicts a sample primary eigenvector graph from which the orientation of the vehicle can be determined. Vector graph 800 is a three dimensional graph with x-axis 810, y-axis 820, and z-axis 830. Each time the processing shown in FIG. 7 is performed, a point (with x, y, and z values) is added to graph 800. In the sample shown, vector 840 results from the sample data points output to graph 800. A vector (eigenvector) that results from the sample data is shown as vector 840 with the vector values, in the sample, being x=0.31, y=−0.37, and z=0.87. This vector is used to compute the heading, or coordinate system, being used by the vehicle and is then used by the mobile device to align the mobile device's coordinate system to the coordinate system of the vehicle.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by a mobile device that includes a processor, a gyroscope, a gravity sensor, and a memory each accessible by the processor, the method comprising:

identifying, at the mobile device that is moving with a vehicle, when a rotation of the gyroscope is at a near-zero moment;

computing, by the mobile device, a primary eigenvector based on a set of computed acceleration values of the vehicle;

detecting, at the mobile device, an acceleration as being on a plane that is near-perpendicular with a gravity sensed by the gravity sensor;

determining a direction of the vehicle based on the primary eigenvector as being parallel to a direction of the detected acceleration; and aligning a coordinate system used in the mobile device with a different coordinate system of the vehicle based on the determined direction of the vehicle.

2. The method of claim 1 wherein the acceleration is a deceleration, wherein the direction of the vehicle is determined to be parallel to a negative direction of the detected acceleration.

3. The method of claim 1 wherein the acceleration is detected from an acceleration observation at the mobile device that is selected from the group consisting of a detection by an accelerometer that an accelerometer fluctuation is increasing, a detection that an engine noise level is increasing, a detection that a speed detected at a global positioning system accessible by the mobile device is increasing, and a detection of a speed increase detected by receiving a set of vehicle speed data from an on-board diagnostic (OBD) included in the vehicle.

4. The method of claim 1 further comprising:
repeatedly receive sensors values from the gyroscope and one or more acceleration based sensors;
in response to the rotation of the gyroscope being at the near-zero state, and the acceleration being on the plane that is near-perpendicular with the gravity, queuing an acceleration value into a buffer at the mobile device; and
computing the primary eigenvector based on the acceleration values queued in the buffer.

5. The method of claim 4 further comprising:
inhibiting the queuing of the acceleration value into the buffer in response to determining that the acceleration is on a non-perpendicular plane to gravity.

6. The method of claim 4 further comprising:
inhibiting the queuing of the acceleration value into the buffer in response to determining that the gyroscope detected a moment that is not near-rotation free.

7. An information handling system included in a mobile device, the information handling system comprising:
one or more processors;
a gyroscope accessible by at least one of the processors;
a gravity sensor that is accessible by at least one of the processors;
a memory coupled to at least one of the processors; and
a set of computer program instructions stored in the memory and executed by at least one of the processors in order to perform actions comprising:
identifying, at the mobile device that is moving with a vehicle, when a rotation of the gyroscope is at a near-zero moment;
computing, by the mobile device, a primary eigenvector based on a set of computed acceleration values of the vehicle;
detecting, at the mobile device, an acceleration as being on a plane that is near-perpendicular with a gravity sensed by the gravity sensor;
determining a direction of the vehicle based on the primary eigenvector as being parallel to a direction of the detected acceleration; and
aligning a coordinate system used in the mobile device with a different coordinate system of the vehicle based on the determined direction of the vehicle.

8. The information handling system of claim 7 wherein the acceleration is a deceleration, wherein the direction of the vehicle is determined to be parallel to a negative direction of the detected acceleration.

9. The information handling system of claim 7 wherein the acceleration is detected from an acceleration observation at the mobile device that is selected from the group consisting of a detection by an accelerometer that an accelerometer fluctuation is increasing, a detection that an engine noise level is increasing, a detection that a speed detected at a global positioning system accessible by the mobile device is increasing, and a detection of a speed increase detected by receiving a set of vehicle speed data from an on-board diagnostic (OBD) included in the vehicle.

10. The information handling system of claim 7 wherein the actions further comprise:
repeatedly receive sensors values from the gyroscope and one or more acceleration based sensors;
in response to the rotation of the gyroscope being at the near-zero state, and the acceleration being on the plane that is near-perpendicular with the gravity, queuing an acceleration value into a buffer at the mobile device; and
computing the primary eigenvector based on the acceleration values queued in the buffer.

11. The information handling system of claim 10 wherein the actions further comprise:
inhibiting the queuing of the acceleration value into the buffer in response to determining that the acceleration is on a non-perpendicular plane to gravity; and
inhibiting the queuing of the acceleration value into the buffer in response to determining that the gyroscope detected a moment that is not near-rotation free.

12. The information handling system of claim 7 wherein the gravity sensor is an accelerometer included in the information handling system and accessible by at least one of the processors.

13. A computer program product stored in a computer readable storage medium, comprising computer program code that, when executed by a mobile device that includes a processor, a gyroscope and a gravity sensor, performs actions comprising:
identifying, at the mobile device that is moving with a vehicle, when a rotation of the gyroscope is at a near-zero moment;
computing, by the mobile device, a primary eigenvector based on a set of computed acceleration values of the vehicle;
detecting, at the mobile device, an acceleration as being on a plane that is near-perpendicular with a gravity sensed by the gravity sensor;
determining a direction of the vehicle based on the primary eigenvector as being parallel to a direction of the detected acceleration; and
aligning a coordinate system used in the mobile device with a different coordinate system of the vehicle based on the determined direction of the vehicle.

14. The computer program product of claim 13 wherein the acceleration is a deceleration, wherein the direction of the vehicle is determined to be parallel to a negative direction of the detected acceleration.

15. The computer program product of claim 13 wherein the acceleration is detected from an acceleration observation at the mobile device that is selected from the group consisting of a detection by an accelerometer that an accelerometer fluctuation is increasing, a detection that an engine noise level is increasing, a detection that a speed detected at a global positioning system accessible by the mobile device is increasing, and a detection of a speed increase detected by receiving a set of vehicle speed data from an on-board diagnostic (OBD) included in the vehicle.

16. The computer program product of claim 13 wherein the actions further comprise:
repeatedly receive sensors values from the gyroscope and one or more acceleration based sensors;
in response to the rotation of the gyroscope being at the near-zero state, and the acceleration being on the plane that is near-perpendicular with the gravity, queuing an acceleration value into a buffer at the mobile device; and computing the primary eigenvector based on the acceleration values queued in the buffer.

17. The computer program product of claim 16 wherein the actions further comprise:

inhibiting the queuing of the acceleration value into the buffer in response to determining that the acceleration is on a non-perpendicular plane to gravity; and inhibiting the queuing of the acceleration value into the buffer in response to determining that the gyroscope detected a moment that is not near-rotation free.

\* \* \* \* \*